Aug. 10, 1954
W. N. FENNEY ET AL
2,685,869
INTERNAL-COMBUSTION ENGINE
Filed Sept. 21, 1948
3 Sheets-Sheet 1
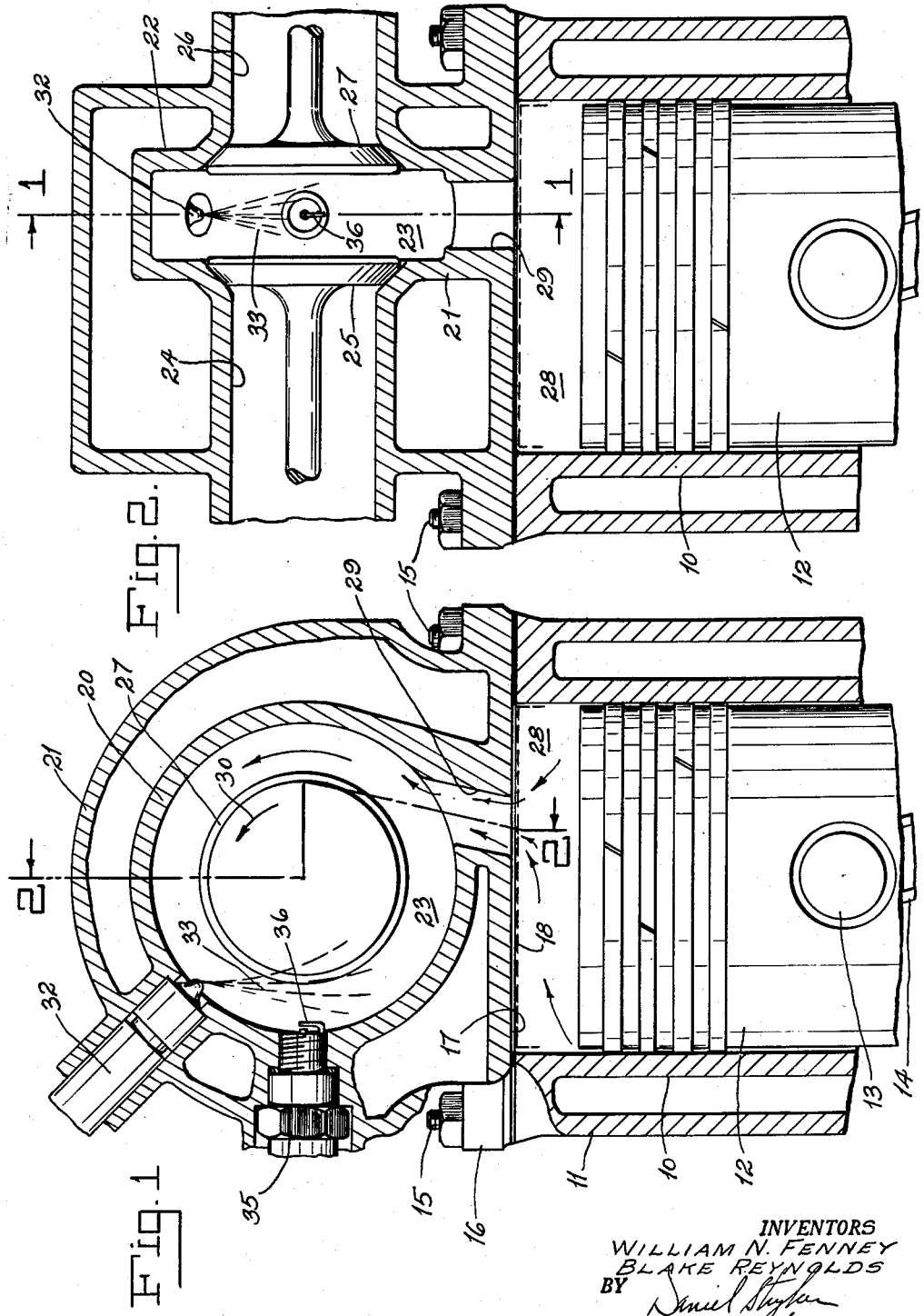
INVENTORS
WILLIAM N. FENNEY
BLAKE REYNOLDS
BY
ATTORNEYS Aug. 10, 1954  W. N. FENNEY ET AL  2,685,869
INTERNAL-COMBUSTION ENGINE
Filed Sept. 21, 1948  3 Sheets-Sheet 2
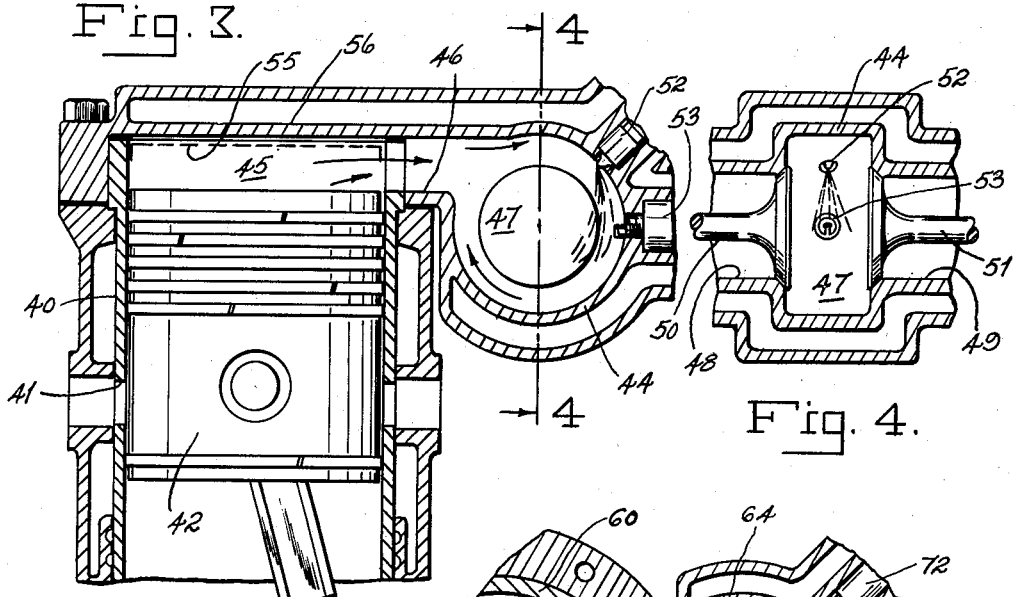
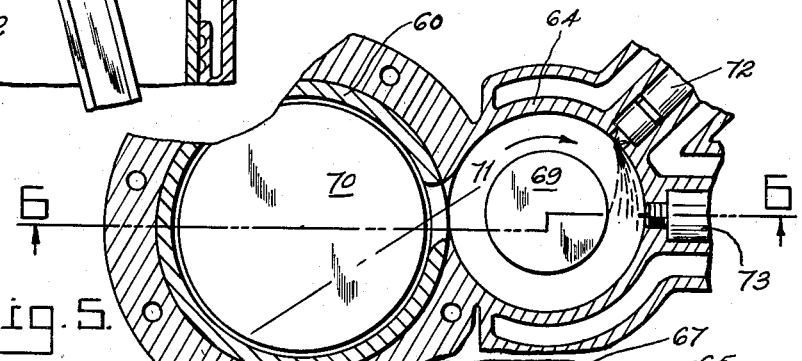
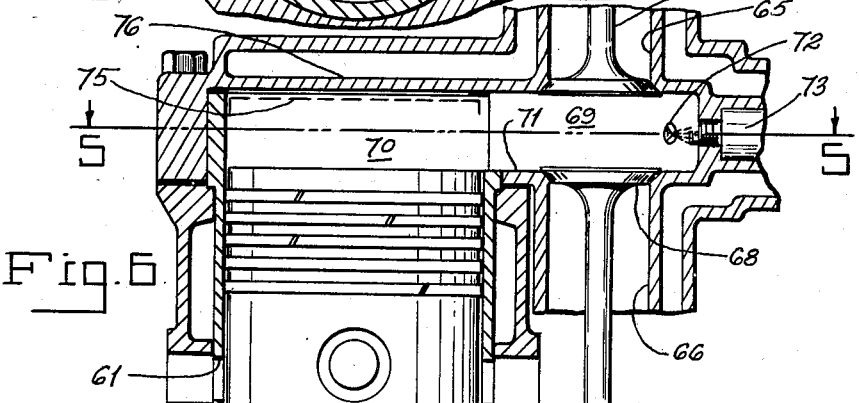
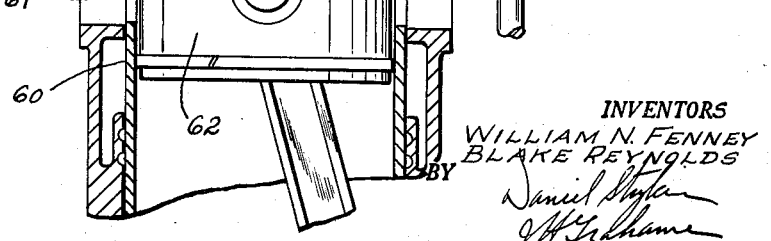
INVENTORS
WILLIAM N. FENNEY
BLAKE REYNOLDS
BY
ATTORNEYS

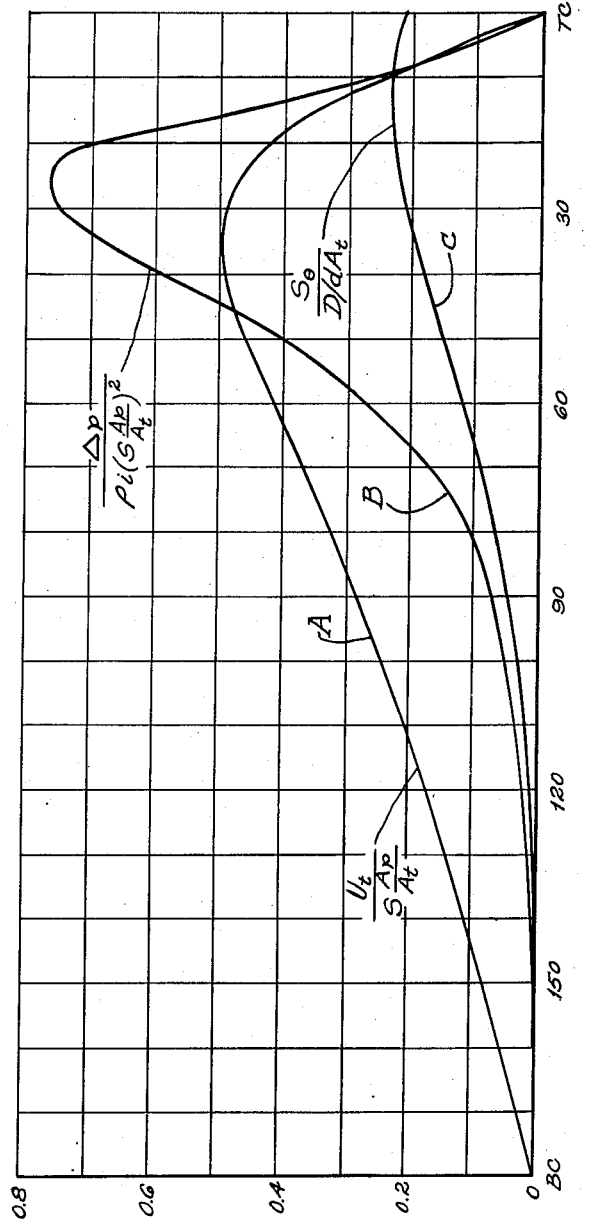

Patented Aug. 10, 1954

2,685,869

UNITED STATES PATENT OFFICE 2,685,869

INTERNAL-COMBUSTION ENGINE

William N. Fenney, Hartsdale, N. Y., and Blake Reynolds, Riverside, Conn., assignors to The Texas Company, New York, N. Y., a corporation of Delaware Application September 21, 1948, Serial No. 50,384

10 Claims. (Cl. 123—32)

This invention relates to an internal combustion engine of the reciprocating piston type operating with fuel injection and immediate ignition, wherein combustion is independent of the spontaneous ignition quality of the fuel employed, and knocking is prevented. More particularly, the invention relates to an engine of this type having a disc-shaped auxiliary combustion chamber providing compression air swirl of high velocity.

In the copending application of Everett M. Barber, Serial No. 10,598, filed February 25, 1948, now Patent No. 2,484,009 dated October 11, 1949, there is disclosed and claimed the method of and apparatus for operating an internal combustion engine in a manner such that knocking is prevented irrespective of the octane or cetane number of the fuel, the mixture density and the compression ratio employed. In accordance with this application, air is introduced into a disc-shaped combustion space confined between the piston and cylinder head of the engine cylinder in a manner to produce a high velocity induction air swirl therein. This air is compressed on the compression stroke of the piston while the air swirl is maintained. The initiating of the injection of fuel occurs about 70–40° before top dead center of the compression stroke into a localized segment of the compressed swirling air on one side of the said main cylinder combustion space and in the direction of air swirl. The first increment of injected fuel is electrically ignited as by spark ignition less than 90° of swirling movement from the locus of injection and substantially as soon as combustible fuel vapor-air mixture is formed therefrom to establish a flame front travelling counter to the direction of air swirl; and the injection of fuel is continued into succeeding increments of the swirling compressed air immediately in advance of the travelling flame front, so that additional increments of combustible fuel vapor-air mixture are progressively formed, ignited and burned substantially as rapidly as formed. In an engine of this type, there is necessarily some reduction in volumetric efficiency due to the required constriction, as by shrouded air intake valve, needed to produce the induction air swirl; and with the customary 180° shroud on the intake valve set tangentially of the combustion space, the maximum air swirl velocity practically attainable without prohibitive loss in volumetric efficiency is around 6–8 rotations of the swirling air mass per engine revolution. Moreover, there is the further requirement that the induction air swirl must persist on each cycle throughout the compression stroke, which further limits the air swirl velocity at the time of injection. The desirability of obtaining a compression air swirl by movement of the piston forcing the compressed air into an auxiliary combustion chamber, whereby the maximum velocity of air swirl is available during the latter part of the compression stroke when injection is taking place, has been recognized. However, due to the fact that combustion takes place in such an auxiliary chamber throughout most of the injection period, the increase in pressure in that auxiliary chamber due to combustion tends to blow flaming products out of the auxiliary chamber into the main combustion space and thus destroy the compression air swirl in the auxiliary chamber. Since this occurs during the continuance of injection, this blow-back interferes with the impregnation of succeeding increments of the compressed air at a uniform fuel-air ratio, destroys the established travelling flame front operation and prevents the non-knocking combustion from being attained.

A principal object of the present invention is to provide a method of and construction for successfully carrying out this non-knocking combustion in an auxiliary combustion chamber with maintained compression air swirl throughout the injection period, notwithstanding the rapid pressure rise due to combustion taking place therein.

A further object of the invention is to provide an engine of this character capable of operating with higher velocities of air swirl than can be obtained by the induction type of air swirl without substantial loss in volumetric efficiency, whereby the non-knocking combustion cycle can be completed more rapidly with higher power output.

A still further object of the invention is to provide a two-cycle engine of this type having improved scavenging of both the auxiliary and main combustion spaces, while attaining the said non-knocking combustion of high efficiency.

Other objects and advantages of the present invention will be apparent from the following description when taken in conjunction with the attached drawing and the appended claims.

In accordance with the present invention, a disc-shaped auxiliary combustion chamber of comparatively large diameter which may vary from a diameter approximately as large as or even somewhat exceeding the diameter of the main combustion space down to a diameter greater than the radius of the main combustion space is provided, together with a piston operating in the main cylinder space with only mechanical clearance from the cylinder head at upper dead center position. The auxiliary chamber is also relatively shallow or small in depth to provide a volume which is coordinated with the displacement volume of the piston in the main cylinder space to give the compression ratio desired, such as about 8:1 to 12:1, preferably about 10:1. In addition, the auxiliary chamber is connected with the main cylinder space by a throat or passage opening from the periphery off-center or non-radially of the disc-shaped auxiliary combustion space in a manner to impart a swirling movement to the air in the disc-shaped auxiliary chamber as that air is forced from the main cylinder space through the throat into the auxiliary space on the compression stroke of the piston. The cross-sectional area of the throat is such that a compression pressure is built up in the main cylinder space during the intermediate part of the compression stroke when the linear velocity of piston movement is high; and said pressure is greater than that existing in the auxiliary combustion space at the time of initiating injection and combustion in the latter. The cross-sectional area of said throat is coordinated with the off-center spacing thereof to produce a velocity of compression air swirl in the auxiliary combustion space which, at about 50° before top center, is equivalent to about 8–15 rotations of the air per engine revolution. At the same time, the throat is purposely designed of sufficiently large cross-sectional area so as to avoid undue pumping and friction losses as result from forcing the air through a very small passage to the auxiliary chamber. For this purpose, a restriction or cross-sectional area of the throat which will produce a pressure differential which may range up to about 25–50 pounds per sq. in. when the engine is motoring or non-firing is ordinarily sufficient, when the timing and configuration of the parts, including ratio of piston stroke to cylinder diameter, are properly correlated with engine speed.

Injection of fuel is initiated into a localized segment of the compression air swirl at one side of the disc-shaped auxiliary combustion space and in the direction of air swirl about 50–25° before top dead center of the piston compression stroke, depending on the velocity of the compression air swirl, so that injection for full load operation involving the impregnation of the swirling air during one complete rotation thereof, is terminated within the period of from about 10° before to about 10° after top dead center. By this construction and timing, the auxiliary chamber is filled with a large proportion of the entire charge of air per cycle at the time of initiating injection, and this compressed air in the auxiliary chamber has substantially its highest velocity of compression air swirl. Moreover, the air pressure in the main cylinder space at this time is higher than in the auxiliary chamber. The first increment of the injected fuel is positively ignited less than 90°, preferably about 45–30°, of swirling movement from the locus of injection, and as soon as combustible fuel vapor-air mixture is formed therefrom to establish the flame front across a radius of the auxiliary combustion space travelling counter to the direction of the compression air swirl therein; and injection is continued into succeeding increments of the compressed swirling air immediately in advance of the flame front in the manner attained in the main cylinder combustion space of the said Barber application. This provides the non-knocking combustion which is dependent on the maintenance of the compression air swirl for the impregnation of the succeeding increments of the swirling compressed air at a fairly uniform fuel-air ratio throughout the injection period.

The excess of pressure existing in the main cylinder space is such as to be maintained, despite the initial combustion occurring in the auxiliary chamber, until the piston has reached at least about 25–20° before top center position. At this time, the remaining clearance volume in the main cylinder space represents such a small proportion of the total displacement volume of the piston and consequently of the air mass in the auxiliary space, that the momentum of the rapidly swirling air within the auxiliary space, coupled with the final movement of the piston to top dead center where it has only mechanical clearance from the head, effectively prevent any appreciable interference with the regular air swirl and the travelling flame front operation in the auxiliary combustion space. By this method, the very rapid rise in combustion pressure within the auxiliary space occurs only after about 20° before top center; and the rapid pressure rise which occurs at this late time in the compression stroke is then ineffective to destroy the compression air swirl and the established flame front combustion until the piston moves downwardly about 10° or more on its power stroke. This permits injection to be completed by about top dead center for full load operation, while the established compression air swirl and the travelling flame front combustion are maintained. The peak pressure rise of typical Otto cycle combustion occurs near but slightly after top dead center. The non-knocking combustion is thereby accomplished in a highly efficient manner with substantially complete air utilization and without loss in volumetric efficiency.

The higher rate of compression air swirl, permitting more rapid combustion on the Otto cycle, also provides higher indicated mean effective pressure and power level with a given size of engine for the same compression ratio and charge density or boost pressure. It also enables injection to be initiated somewhat later in the cycle, preferably about 45–25° BTC, and still complete injection for full load operation at about top center and obtain typical Otto cycle combustion; and this further contributes to avoiding the steep pressure rise due to combustion until the piston has reached about 20° BTC. The present invention is advantageous for four-cycle operation. In addition, it is particularly applicable to two-cycle engines operating on the Otto cycle, as it enables improved scavenging of both the main and auxiliary spaces to be obtained by a uniflow circulation.

It has heretofore been suggested, as in Wolfard No. 1,305,579, to carry out simultaneous injection and combustion in an elongated or arcuate-shaped auxiliary combustion chamber, wherein the movement of the main cylinder piston is relied on to produce a regular flow of air from the main combustion space past the injection nozzle into the auxiliary space. However, in the odd-shaped auxiliary combustion spaces of this patent, there is no means to maintain a regular air movement during most of the injection period after combustion has started, since the increase in pressure due to combustion in the auxiliary space blows the flaming products as well as unburned fuel particles back into the main cylinder space and prevents any established flame front operation from being attained.

Also, flattened disc-shaped auxiliary combustion chambers have heretofore been proposed for diesel engines, or spark ignition engines functioning on the diesel constant pressure cycle, wherein injection is initiated close to top dead center and continues for a substantial period of the initial power stroke. These constructions have been utilized to promote turbulence. There is no established flame front operation in these engines, and there is no possibility of obtaining regular directed movement of air past the injection nozzle in the auxiliary combustion space during the main portion of the injection period which occurs when the piston is moving downwardly on its power stroke.

The use of disc-shaped auxiliary combustion chambers operating with compression air swirl, wherein injection occurs during the latter part of the compression stroke, has also been proposed in engines of the Hesselman type. But in this case, injection is complete or substantially complete prior to ignition. This is merely an adaptation of the Hesselman principle to a compression swirl chamber; but there is no problem here of balancing the excess pressure due to combustion during the early part of the injection period because ignition and combustion do not take place until the impregnation of the swirling air has been substantially completed.

The present invention is distinguished from the foregoing by a novel combination of the particular configuration, volume relationship and construction of the disc-shaped auxiliary combustion chamber and the main cylinder chamber, together with the timing of injection into a localized side of the auxiliary space and the immediate electrical ignition to obtain the traveling flame front operation therein during the latter part of the compression stroke to provide combustion on the Otto cycle, as well as a proper coordination of the cross-sectional area of the throat with the other parts to build up an excess pressure in the main space over that present in the auxiliary space at the time of initiation of injection and ignition and continuing until the piston has reached at least about 25–20° before top dead center, and finally the proper off-center positioning of the throat entrance into the auxiliary combustion space for the selected cross-sectional area of the throat to produce the desired velocity of compression air swirl, whereby the regular compression air swirl and the established flame front operation are maintained in the auxiliary space throughout the injection period irrespective of the combustion taking place therein.

The invention is more particularly illustrated in the drawing which discloses preferred embodiments thereof and wherein:

Fig. 1 is a vertical sectional view on the plane of the line 1—1 of Fig. 2 of an engine cylinder constructed in accordance with the present invention;

Fig. 2 is a vertical sectional view on the plane of the line 2—2 of Fig. 1;

Fig. 3 is a vertical sectional view similar to Fig. 1 of a modification;

Fig. 4 is a vertical sectional view of the auxiliary combustion chamber on the plane of the line 4—4 of Fig. 3;

Fig. 5 is a horizontal sectional view on the plane of the line 5—5 of Fig. 6 of a further modification;

Fig. 6 is a vertical sectional view on the plane of the line 6—6 of Fig. 5; and

Fig. 7 is a typical plot for the present engine depicting curves for the velocity of air flow through the throat, the pressure drop through the throat, and the rate of compression air swirl in the auxiliary chamber for the different positions of the piston in crank angle degrees on its compression stroke.

Referring to Figs. 1 and 2, the engine cylinder is shown at 10 with water jacket 11, piston 12, wrist pin 13 and connecting rod 14 running to the usual crank shaft (not shown). Fastened by bolts 15 to the upper end of the cylinder 10 is a cylinder head 16, the lower surface 17 of which has only mechanical clearance from the top of piston 12 when the latter is in upper dead center position indicated by the dotted line 18.

The cylinder head 16 is formed with cylindrical auxiliary combustion chamber 20 surrounded by water jacket 21. As shown, the diameter of the auxiliary chamber 20 in the plane of Fig. 1 is only slightly less than the diameter of cylinder 10. However, the auxiliary chamber has flattened side walls 21 and 22 (Fig. 2), forming disc-shaped auxiliary space 23 which is comparatively narrow in thickness, as clearly evident from Fig. 2. While the construction shown, having flattened side walls constitutes a preferred embodiment, it will be understood that these side walls can also be convex or concave or even approach a spherical shape; and the expression "disc-shaped" as used throughout the description and claims is to be understood as covering these constructions and signifying the space defined by a geometrical figure spinning on its axis. Opening into the side wall 21 centrally of the disc-shaped space 23 is an air intake passage 24 controlled by intake valve 25. Opening through the flattened side wall 22 centrally of the disc-shaped space 23 is an exhaust passage 26 controlled by exhaust valve 27. Auxiliary combustion space 23 is connected with the main cylinder space 28 above piston 12 by a throat 29 which, as shown clearly in Fig. 1, opens off-center or non-radially of space 23. Consequently on the compression stroke of piston 12, air being compressed is forced from the main cylinder space 28 through throat 29 into the auxiliary combustion space 23 in a manner to impart a high compression air swirl in the latter in the direction of the arrow 30. For reasons described in greater detail hereinafter, throat 29 does not open tangentially of the outer circle or periphery of auxiliary space 23, but opens tangentially of a smaller concentric circle of the auxiliary space, said concentric circle having a diameter which is substantially less than that of auxiliary space 23.

Mounted in cylinder head 16 and extending through the peripheral wall of auxiliary chamber 20 is a fuel injection nozzle 32 having a spray port or ports directed to discharge a fuel spray 33 at one side of the auxiliary space 23 in the direction of air swirl (Fig. 1). The spray is preferably cone-shaped so as to substantially fill the thickness of the disc-shaped space 23, as shown in Fig. 2. It will be understood that fuel nozzle 32 is connected by a suitable injection line to a conventional fuel pump driven in synchronism with the engine and at one-half engine speed for four-cycle operation, said pump having provisions for controlling and regulating the time of initiation and duration of injection on each cycle in accordance with engine load.

Also mounted in head 16 and extending through the periphery of chamber 20 at a point less than 90° of swirling movement from the tip of fuel injection nozzle 32, and preferably about 45–30° therefrom, is a spark plug 35 having electrodes 36 positioned at the periphery of the auxiliary space. It will be understood that the spark plug 35 is connected in a conventional automotive ignition system having a distributor driven in synchronism with the engine, whereby a spark of igniting intensity is available at electrodes 36 about 4-12 crank angle degrees following the initiation of injection from nozzle 32. As the conventional ignition circuits produce a spark of ignitable intensity which has a duration of about 5-15 or more crank angle degrees, the timing of the spark can be conveniently set to about coincide with the injection advance, and a spark of ignitable intensity will then be available at the time the first increment of injected fuel from spray 33 in combustible mixture form contacts the electrodes 36. While a spark plug is disclosed as a preferred embodiment, it is to be understood that other positive ignition means, such as a glow plug connected in an electrical circuit so that exterior electrical energy is supplied thereto, can also be utilized.

As shown in Figs. 1 and 2, the throat 29 is constricted relative to the diameter of the auxiliary space 23. This constriction in cross-sectional area is such as to produce an excess of pressure which may range up to about 25-50 pounds per square inch in the main cylinder space 28 over that existing in the auxiliary space 23 at the time of initiation of fuel injection, which latter is about 50-25° before top dead center. This excess pressure in space 28 thus maintains the directed air flow from space 28 through throat 29 into chamber 23 at the time of initiating injection and combustion in chamber 23. Since the pressure rise due to combustion in chamber 23 is relatively slow during the initial part of the injection period, or until about 20-15° before top dead center of the compression stroke of piston 12, it will be appreciated that the excess pressure in the main cylinder space 28 over that existing in auxiliary space 23 is thus maintained during this initial period.

When the piston 12 has reached about 20° before top dead center, the remaining clearance volume in space 28 is then a small fraction of the total displacement volume of the piston on its compression stroke, such as about 1/35 thereof. With a compression ratio of 10:1 which requires a volume of about 1/9 of the piston displacement volume in the auxiliary space 23, this means that by 20° BTC at least about 75% of the air mass has been forced into the auxiliary space 23 where it is rotating at high velocity and thus has acquired substantial momentum. Even though the pressure rise in space 23 due to combustion takes place very rapidly between 20° BTC and top dead center, so as to quickly surpass the pressure then existing in the main cylinder space 28, this reversal of the relative pressures existing in 23 and 28 has little effect on the compression air swirl in 23 at this late period in the compression stroke. This is because the remaining clearance volume in space 28 at this time is so small and the time element so short that the only possible disturbance is in the throat 29 and at the periphery of the swirling air mass immediately adjacent the throat entrance. The momentum of the rotating air mass in 23 effectively overbalances the localized disturbance at the entrance of the throat and thus maintains the regular compression air swirl. Finally, the movement of piston 12 to top dead center with only mechanical clearance from head 17 effectively prevents any appreciable backflow from auxiliary chamber 23 through throat 29 into the main cylinder space until after the piston has passed top dead center. By this time, the injection has been completed in the auxiliary space 23 even for full load operation, with the result that the maintained compression air swirl has insured the impregnation of the compressed air at the desired fuel-air ratio throughout the injection period.

When the injection starts on each cycle, the substantially immediate electrical ignition of the first increment of injected fuel initiates combustion, and a flame front is established in the auxiliary space 23 which extends generally across one side of the disc-shaped combustion space between the spark plug and the center of the cylinder. This flame front travels with high velocity counter to the direction of air swirl. Normally, the velocity of flame propagation tends to exceed the velocity of air swirl, but the flame velocity is impeded by the air swirl and also by encountering excessively rich mixture as it tends to approach closer to the nozzle tip. The practical effect then is to maintain the flame front in a relatively fixed position with respect to the cylinder wall, plug and nozzle, although the flame front is travelling at high velocity relative to the air swirl. Since there is substantially no interference with the regular swirl in auxiliary space 23 during this injection and combustion period, and since the succeeding increments of compressed swirling air are impregnated at a desired fuel-air ratio immediately in advance of this flame front during the completion of the injection period, the established travelling flame front operation of non-knocking combustion is maintained until after injection on each cycle is complete and the piston has passed its top dead center position. The piston is then driven on its working stroke, the exhaust valve 27 then opens, and exhaust takes place on the return stroke of the piston; the exhaust valve closes, and the intake valve opens on the suction stroke to fill the cylinder with a fresh charge of air, and the four-cycle operation is then repeated.

The following specific example of the invention is given by way of illustration. The main cylinder space 28 is 3¼" in diameter, and the piston 12 has a stroke of 4½", providing a piston displacement of 37.4 cubic inches. The auxiliary combustion space 23 has a diameter of 3" and a thickness of ½", providing a volume of 3.53 cubic inches. With the piston 12 having only mechanical clearance from the head 17, the following data were obtained on clearance volume above the piston in cubic inches in main cylinder space 28 for the indicated piston positions in crank angle degree before and after top dead center, together with the pressures existing in main cylinder space 28 above the pressures existing at the same time in the cycle of the engine when motoring or non-firing, at two different fuel-air ratios with a 50° injection advance.

| Crank Angle Degrees | Clearance Volume Above Piston in Main Cylinder Space in cu. in. (37.4 cu. in. piston displacement) | Pressure in Pounds Per Sq. In. When Firing Above Pressure of Motoring Engine-Non-Knocking Combustion Operation with 50° BTC Injection Timing | |
|---|---|---|---|
| | | .04 F/A | .08 F/A |
| 20 BTC | 1.1 | 40 | 40 |
| 10 BTC | 0.2 | 235 | 315 |
| 0 TDC | 0 | 345 | 480 |
| 5 ATC | 0.1 | 360 | 505 |
| 20 ATC | 1.1 | 285 | 415 |
| 40 ATC | 5.2 | 160 | 235 |
| 60 ATC | 10.8 | 95 | 145 |

The foregoing data show that, when operating the engine on the non-knocking combustion principle as previously described, utilizing substantially the maximum injection advance of 50° BTC, the pressure due both to movement of the piston and to combustion at 20° before top center is only forty pounds per sq. in. above the pressure of the engine when motoring, which latter is due to the compressive movement of the piston alone. This is true at both .04 fuel-air weight ratio and .08 fuel-air weight ratio, which includes most of the operative fuel-air ratio range normally employed. This demonstrates that the pressure rise due to combustion during the first 30° of the injection period occurs at a relatively low rate; and that an excess pressure of forty pounds per sq. in. in main cylinder space 28 over that existing in the auxiliary space 23 with the engine motoring provides an overbalancing pressure in the main cylinder space 28 until the piston has moved beyond 20° BTC on its compression stroke with the engine firing. When the piston is at 20° BTC, the clearance volume above the piston in space 28 is then only 1.1 cu. in. with a volume of 3.53 cu. in. in auxiliary space 23. This means that the piston has forced all but about 23.8% of the air mass into the auxiliary space 23 by 20° BTC. On the other hand, at 40° BTC or 40° ATC, the clearance volume above the piston in space 28 is 5.2 cu. in. which is larger than the volume of the auxiliary chamber. The latter represents a sufficient proportion of the total air mass that an excess of pressure in auxiliary space 23 due to combustion over that existing in main cylinder space 28 would effect a blowback through throat 29 such as to interfere with the desired compression air swirl and flame front operation in auxiliary space 23. By maintaining the pressure in the main space 28 greater than that existing in auxiliary space 23 during this critical period, this interference is effectively avoided.

Between 20° BTC and 10° BTC, the pressure due combustion rises very rapidly as indicated by the table, with 235 pounds per sq. in. above that of a motoring engine at .04 fuel-air ratio, and 315 pounds per sq. in. above that of a motoring engine at .08 fuel-air ratio, at 10° BTC. However, during this period, the clearance volume above the piston in space 28 is quuite small in comparison to the auxiliary chamber volume, varying from 1.1 cu. in. at 20° BTC to 0.2 cu. in. at 10° BTC. This latter clearance volume is not substantially greater than that existing in throat 29. Therefore, the excess pressure in auxiliary space 23 due to combustion during this period can create at most only a turbulence in throat 29 and at the outer periphery of the air swirl immediately opposite throat 29. The momentum of the rapidly swirling air in 23 during this period is sufficient to greatly overbalance the effect of this turbulence, and the regular air swirl persists. The final movement of the piston to top center with only mechanical clearance from the cylinder head then effectively prevents any backflow, while the peak pressure rise due to combustion is being attained for typical Otto cycle combustion, this occurring approximately 5° after top center as shown by the table.

The foregoing data clearly illustrate that a design of throat 29 producing an excess pressure in main cylinder space 28 above that in auxiliary space 23 of the order of 25–50 pounds per sq. in. with the engine motoring is sufficient to maintain the desired compression air swirl and flame front combustion in auxiliary space 23 throughout the critical period when there is sufficient clearance volume remaining in space 28 that a reversal of flow could occur. Thereafter, there is no problem of maintaining the regular air swirl and the flame front combustion, since the clearance volume in space 28 is then too small, and the momentum of the air swirl sufficiently great. The critical period in the operation in which the pressure in main space 28 should be greater or at least equal to the pressure in auxiliary space 23 is thus between the time of initiation of injection and about 25–20° BTC.

The practical maximum cross-sectional area of throat 29 for the specific example set forth above is about 0.13 square inch. This maximum is limited by the restriction required to produce an excess pressure in main space 28 over that existing in auxiliary space 23 of about 25 lbs./in.². The minimum cross-sectional area of throat 29 so as to avoid undue pumping losses is about 0.09 square inch. This provides a substantial constriction of throat 29 capable of building up an excess pressure in main cylinder space 28 over that existing in auxiliary chamber 23 of around fifty pounds per sq. in.

The range of sizes of the throat required to build up the said excess pressure range gives rise to another problem, which is the desired air swirl velocity. In the specific example set forth above, where the throat enters on a tangent to the outer circle or periphery of the auxiliary chamber 23, the theoretical air swirl velocity assuming 100% swirl efficiency, calculates to 22 rotations per engine revolution when the maximum throat area of 0.13 in.² is used, and to 32 rotations per engine revolution when the minimum throat area of 0.09 in.² is used. Actually, friction and inertia may reduce the swirl efficiency to as low as around 75%; and this gives an actual range of air swirl velocities of 16.5 to 24 rotations per engine revolution. This is above the range desired, since the said higher swirl rates require so rapid a rate of injection as to result in rough engine operation. As set forth above, the swirl rate is preferably maintained within the range of about 8–15 rotations per engine revolution, requiring an injection duration for full load operation of about 45–24 crank angle degrees.

From actual tests on swirl rates with an auxiliary disc-shaped chamber as illustrated in Figs. 1 and 2, it has been found that the following equation holds:

$$S = S_{max} \frac{d'}{d}$$

where $S$ is the desired swirl rate, $S_{max}$ is the maximum swirl rate attained by having the throat tangential to the outer circle or periphery of the auxiliary chamber, $d$ is the diameter of the auxiliary chamber, and $d'$ is the diameter of a concentric circle within the auxiliary chamber to which the center line or axis of the throat is tangential. Thus, by having the throat enter the auxiliary chamber off-center, so that the center line of the throat is tangential to a concentric circle of diameter $d'$ which bears the required relation to diameter $d$ of the auxiliary chamber as to reduce $S_{max}$ to $S$, the lower desired swirl rate is secured, while retaining the excess pressure features described above. For example, and as an extreme case, with the minimum cross-sectional area of the throat of 0.09 in.², in order to obtain a swirl velocity of 8 rotations per engine revolution, the center line of the throat is made tangent to an inscribed circle of the auxiliary chamber having a diameter equal to $$\frac{8}{24} \times 3.0 \text{ inches or } 1 \text{ inch}$$

(assuming a 75% swirl efficiency). The actual swirl efficiency can readily be determined by known methods for any particular engine construction or configuration, and the positioning of the throat for the desired swirl rate can then be determined in the above manner.

Design calculations for the present engine are based on the following equations which have been developed in order to solve the radically new problems presented herein:

Equation 1 below was derived as an approximation by assuming that, during the compression stroke of the piston, the density of the air in the main cylinder space remains the same as the density of the air in the auxiliary combustion space; then (1) $$U = S \frac{Ap}{At} \frac{\pi (\sin \theta)}{2\left[1 + \frac{R-1}{2}(\cos \theta)\right]}$$

where $U$ is the velocity of air flow through the throat
$S$ is the mean piston speed
$Ap$ is the area of the piston
$At$ is the area of the throat
$\theta$ is the crank angle from bottom center, and
$R$ is the compression ratio Referring to Fig. 7, curve A was plotted for the specific example set forth above for the engine of Figs. 1–2, with a compression ratio of 10:1. This shows that the velocity of air flow through the throat with the engine motoring rises steadily until about 35° BTC, and then falls off sharply.

Utilizing the values of air velocity to obtained, then the pressure drop through the throat for any crank angle position can be calculated from Equation 4 below. This is derived by using the formula (2) $$\Delta p = \frac{1}{2} \rho U^2$$

where $\Delta p$ is the pressure drop through the throat,
$\rho$ is the mass density of the air and
$U$ is the air velocity.

Substituting the value of $U$ from Equation 1 in Equation 2, and converting the mass density to standard conditions by the formula (3) $$\rho i = \frac{M}{D+V}$$

where $M$ is the air mass
$D$ is the piston displacement
$V$ is the volume of the auxiliary chamber, and
$\rho i$ is the mass density at initial condition or at bottom center then the following equation is derived:

(4) $$\Delta p = \rho i \left(S \frac{Ap}{At}\right)^2 \frac{\pi^2 R}{8} \frac{\sin^2 \theta}{\left[1 + \frac{R-1}{2}(1+\cos \theta)\right]^3}$$

Referring again to Fig. 7, the values of pressure drop through the throat for the said specific example are plotted for the various crank angle positions as curve B. This shows that the pressure drop through the throat, which means the excess pressure in the main cylinder space over that existing in the auxiliary chamber with the engine motoring, is quite small until the piston has passed 90° BTC, begins to rise quite sharply at about 60° BTC, reaches a fairly high value by 50° BTC and a maximum at about 25° BTC, and then falls off very rapidly. But the values are all high during the critical period from the initiation of injection to at least 20° BTC; so that by having the throat of the required cross-section to produce a maximum excess pressure (pressure drop through the throat) of about 25–50#/in.², it is readily evident that the required excess pressure is maintained during the critical period.

The swirl rate in the auxiliary chamber for the various crank angle positions is calculated from the following equation:

(5) $$S_\theta = \frac{D}{Atd}\left\{\frac{\sin \theta}{2\left[1 + \frac{R-1}{2}(1+\cos \theta)\right]} - \frac{R+1}{4R}\sin \theta + \frac{(R-1)\left[1 + \frac{R-1}{2}(1+\cos \theta)\right]}{2R^{3/2}} \tan^{-1}\left(\frac{\tan \frac{\theta}{2}}{R^{1/2}}\right)\right\}$$

where $S_\theta$ is the air rotations in the auxiliary chamber per engine revolution and the remaining symbols are the same as above.

Referring again to Fig. 7, the swirl rate in the auxiliary chamber for the various crank angle positions in connection with the said specific example is plotted as curve C, using the foregoing Equation 5. It will be noted that the swirl rate for the engine when motoring increases slowly up to a maximum at about 15° BTC and then falls off only slightly by top center. By 50° BTC the swirl rate has reached about ⅔ of its maximum; and during the entire injection period the swirl rate is at a high value. It is to be understood that the increase in swirl rate, as well as the increase in mass density of the air, during the injection period can be compensated by increasing the rate of fuel injection during each cycle to impregnate the succeeding increments of air at a controlled fuel-air ratio. While the foregoing curve for swirl rate is plotted for a swirl efficiency of 100% and for the throat tangential to the periphery of the auxiliary chamber, it enables the actual swirl rates to be closely approximated by determining the actual swirl efficiency and applying a correction therefor, and also correcting for the offset of the throat center line from the tangent to the auxiliary chamber as described above. Moreover, in speaking of swirl rates, it will be appreciated that it is the average swirl rate during the injection period that is important, and it is this average value that is referred to unless the contrary appears from the text.

In the foregoing examples which are based upon the calculations and curves discussed above, it will be appreciated that the values given apply only for a compression ratio of 10:1 and an engine speed of 1800 R. P. M. But the design calculations can be made in a similar manner for other compression ratios and other engine speeds. In the case of a variable speed engine, the problem is somewhat more complicated, since the pressure drop through the throat varies as the square of the piston speed. Therefore, the cruising piston speed is ordinarily selected for design calculations as representing an average value of greatest use. The present engine is ordinarily designed as a slow to medium speed engine; for example, one having a cruising speed of about 1800 R. P. M. with an upper high speed maximum of around 2400 R. P. M. Moreover, idling or slow speed operation is with the engine operating at about a minimum of 1200 R. P. M.

In the foregoing specific example, it will be noted that the throat area range required to produce 25–50 lbs./in.$^2$ excess pressure in the main cylinder space over that in the auxiliary chamber is provided by a throat circular in cross-section having a diameter varying between 0.41 inch and 0.34 inch. In general, the throat area will vary in accordance with Equation 4 above to maintain the maximum pressure drop through the throat at the required value within the range of 25–50#/in.$^2$ as set forth above. It will be understood that the throat need not be circular in cross-section but can be elliptical with the longer axis generally extending across the thickness of the auxiliary chamber in the plane of Fig. 2. The central axis of the throat will ordinarily be tangent to a concentric circle of the auxiliary chamber having a diameter varying from about ½ to ¾ of the auxiliary chamber diameter.

Figs. 3 and 4 illustrate a modification of the present invention adapted for two-cycle operation. In this case, the main cylinder 40 is equipped with a circumferential series of air intake ports 41 positioned somewhat above the top of the piston 42 when the latter is at bottom dead center. The auxiliary combustion chamber 44 is mounted vertically at the side of cylinder 40 and is connected with the main cylinder space 45 by a horizontally extending throat 46 which opens tangentially of an inscribed circle of the auxiliary combustion space 47. Chamber 44 is provided in its opposite side walls with exhaust passages 48 and 49 controlled by dual exhaust valves 50 and 51, respectively. Chamber 44 carries fuel injection nozzle 52 and spark plug 53 positioned in the same general relationship as described above in connection with Figs. 1 and 2.

In this case, the auxiliary chamber 47 is of somewhat increased thickness, providing an engine of a lower compression ratio of the order of about 8:1. The throat 46 is circular in cross section and is of intermediate size within the limits discussed above.

In the operation of this engine, assuming the piston 42 to be descending on a power stroke, both exhaust valves 50 and 51 open simultaneously at about 40° before bottom center. The piston 42 then uncovers the air intake ports 41 at about 25° before bottom center, permitting a flow of air upwardly through the main cylinder 45 driving the combustion products ahead of the column of air in uniflo circulation through throat 46, auxiliary chamber 47 and thence out through the exhaust passages 48 and 49 to secure effective scavenging. The exhaust valves simultaneously close at about 15° after bottom center, and further movement of the piston on its compression stroke covers the air intake ports 41 at 25° after bottom center. The piston then continues on its compression stroke producing a high velocity compression air swirl in auxiliary space 47 of the order of about 10 rotations per engine revolution, together with an excess pressure of about 40 pounds per sq. in. in main cylinder space 45 over that existing in auxiliary space 47 at the time of initiating injection at about 45° before top center. Spark ignition occurs immediately with the flame front combustion in auxiliary space 47, as previously described, with injection terminating at about 9° before top center for full load operation. The final movement of piston 42 to top center position indicated at 55, where it has only mechanical clearance with the cylinder head 56, produces a "squish" effect on the final portion of compressed air which increases the turbulence and permits more rapid completion of any secondary combustion in auxiliary space 47 shortly after top dead center. The piston is accordingly driven on its power stroke, and the cycle is then repeated.

Figs. 5 and 6 illustrate a further modification also adapted for two-cycle operation. In this case, the cylinder 60 is equipped with a circumferential series of exhaust ports 61 arranged somewhat above the top of the piston 62 when the latter is at bottom dead center. Mounted at the side of cylinder 60 is a horizontal disc shaped auxiliary combustion chamber 64 provided in its opposite side walls with air intake passages 65 and 66 controlled by dual intake valves 67 and 68, respectively. The disc shaped auxiliary combustion space 69 is connected with the main cylinder space 70 by a horizontal throat 71 of substantially the maximum cross-sectional area within the limits specified above and opening tangentially of an inscribed circle of the auxiliary space 69. The auxiliary chamber 64 carries in its periphery fuel injection nozzle 72 and spark plug 73 in the relationship previously described.

In the operation of this engine, assuming piston 62 to be descending on its power stroke, the exhaust ports 61 are uncovered about 30° before bottom center. The dual intake valves 67 and 68 then simultaneously open about 20° before bottom center, creating a uniflow circulation and driving the combustion products ahead of the air column from the auxiliary space 69 through throat 71, and thence down through the main cylinder space 70 to the exhaust ports 61. The rising movement of the piston on its compression stroke closes the exhaust ports at 30° after bottom center, and the intake valves then close about 40° after bottom center. Piston 62 continues on its compression stroke, creating a compression air swirl in auxiliary combustion space 69 of the order of about 8 rotations per engine revolution, and an excess pressure within main cylinder space 70 above that existing in auxiliary space 69 of about 25 pounds per sq. in. at the initiation of fuel injection which occurs about 50° before top center. Spark ignition occurs immediately with the characteristic non-knocking flame front combustion, and with a duration of injection of about 45° for full load operation. The previously described "squish" effect is again obtained as the piston moves to its top center position indicated at 75, with only mechanical clearance from the cylinder head 76. The piston is then driven on its power stroke, and the cycle is repeated.

Obviously many modifications and variations of the invention as above set forth may be made without departing from the spirit and scope thereof, and therefore only such limitations should be imposed as are indicated in the appended claims.

What we claim is:

1. In the operation of an internal combustion engine of the reciprocating piston type having a disc-shaped compression air swirl auxiliary combustion chamber into which substantially all of the air is forced from the main cylinder space at the top of the piston compression stroke, the method which comprises restricting the flow of air from said main cylinder space into said auxiliary chamber to thereby build up a higher air pressure in the main cylinder space than in said chamber during at least the intermediate portion of said piston compression stroke and directing said flow of air off center of said auxiliary chamber and tangential to a concentric circle of said auxiliary chamber having a diameter varying from about ½ to ¾ of the auxiliary chamber diameter to produce an air swirl of predetermined regularity, initiating injection of fuel into a localized portion of the swirling air in said chamber about 50 to 25° prior to top dead center of said piston compression stroke and when the air pressure in said chamber is less than in said main cylinder space, electrically igniting the first increment of injected fuel less than 90° of arc downstream of said locus of injection and substantially as soon as combustible fuel vapor-air mixture is formed to establish a flame front traveling in said auxiliary combustion space counter to the direction of air swirl therein, continuing injection of fuel into said swirling air immediately in advance of said traveling flame front to progressively form additional increments of combustible fuel vapor-air mixture which are ignited by said traveling flame front and burned substantially as rapidly as formed, and maintaining the pressure in said main cylinder space greater than in said chamber during a sufficient portion of said injection to sustain said air swirl past said locus of injection within said chamber until said injection has terminated.

2. The method according to claim 1, wherein injection is initiated about 45–30° before top dead center, and continues for full load operation until about top dead center.

3. The method according to claim 1, wherein the air is introduced on the suction stroke of four-cycle operation into the auxiliary combustion chamber and passes from there into the main cylinder space, and resulting combustion products flow from the main cylinder space into the auxiliary combustion chamber and are discharged from the latter on the exhaust stroke of said piston.

4. The method according to claim 1 wherein operation on the two-stroke cycle includes introducing air into the main cylinder space just above the lower portion of piston travel therein for traveling in a uni-flow direction upwardly in a rising column through the main cylinder space and then through the auxiliary combustion chamber while exhausting from opposite sides of said chamber to scavenge the combustion products from both the main cylinder space and the auxiliary combustion chamber during the latter part of the piston power stroke and the early part of said compression stroke.

5. The method according to claim 1, wherein the resulting combustion products are exhausted from the main cylinder space just above the lower portion of piston travel on the power stroke of two-cycle operation, while air is introduced at opposite sides of the disc shaped auxiliary combustion chamber and thence passes into the main cylinder space, traveling in the latter downwardly in a uniflow direction to scavenge the combustion products from both the auxiliary combustion chamber and the main cylinder space, the introduction of air being continued for a short period of the cycle following the termination of the exhaust by the rising movement of the piston on the initial part of the compression stroke.

6. An internal combustion engine comprising a cylinder having a piston reciprocatingly mounted therein providing a main cylinder space, a disc-shaped auxiliary combustion chamber having a diameter substantially greater than its thickness, air inlet means for said cylinder, a short throat passage connecting said main cylinder space with said auxiliary combustion chamber and entering tangentially of an inscribed circle of said chamber having a diameter varying from about ½ to ¾ of that of the auxiliary combustion chamber to produce a swirl of air therein responsive to a compression stroke of said piston, a fuel injection nozzle mounted in the periphery of said chamber and directed to produce a fuel jet in the direction of air swirl extending substantially across the thickness of said chamber but confined to a localized portion of swirling air across a radius of said chamber, electrical ignition means mounted in the periphery of said chamber less than 90° of arc downstream of said nozzle, means coordinated with engine operation for initiating fuel injection about 50° to 25° before top dead center of said piston compression stroke and for immediately actuating said electrical ignition means to ignite the first increment of injected fuel substantially as soon as fuel vapor-air mixture has formed, said throat passage restricting air flow during at least the intermediate portion of said piston compression stroke to produce a higher air pressure in said main cylinder space than in said auxiliary chamber at the time of initiation of injection and ignition and until at least about 25 to 20° BTC in spite of the combustion occurring in said auxiliary chamber.

7. An internal combustion engine according to claim 6, wherein said electrical ignition means is a spark plug having electrodes positioned adjacent the periphery of said disc shaped auxiliary chamber about 30–45° of swirling movement from the nozzle tip, and said means coordinated with engine operation initiates injection for full load operation about 45–30° before top dead center of the piston compression stroke with said means controlling the rate and duration of injection providing for termination of the injection period around top dead center.

8. In the operation of an internal combustion engine of the reciprocating piston type having a disc-shaped compression air swirl auxiliary combustion chamber into which substantially all of the air is forced from the main cylinder space at the top of the piston compression stroke, the method which comprises initiating injection of fuel about 50 to 25° prior to top dead center of said piston compression stroke into a localized portion of compressed swirling air at one side of a diameter of said disc-shaped auxiliary chamber but substantially extending across the thickness of said disc-shaped auxiliary chamber, immediately and positively igniting the first increment of injected fuel less than 90° of arc downstream of said locus of injection to establish a flame front across a radius of said chamber traveling counter to the direction of air swirl therein, continuing injection of fuel at a controlled rate coordinated with air swirl velocity into succeeding localized portions of the swirling air immediately in advance of the formed flame front so that the additional portions of combustible mixture are progressively formed and burned substantially as rapidly as formed, thereby providing combustion on the Otto cycle with injection terminating close to top dead center for full load operation, and restricting and directing the flow of air from said main cylinder space off center into said auxiliary chamber and tangential to a concentric circle of said chamber having a diameter varying from about ½ to ¾ of the auxiliary chamber diameter to maintain the regularity of the air swirl in said chamber correlated with the fueling rate substantially throughout the injection period in spite of the combustion simultaneously occurring in said chamber.

9. In an internal combustion engine of the reciprocating piston type having a compression air swirl auxiliary combustion chamber connected to the main cylinder space by a relatively short throat passage, with the piston having substantially only mechanical clearance in the main cylinder space at the top of its compression stroke, the combination wherein the said auxiliary chamber is disc-shaped with a diameter substantially greater than its thickness and with a volume in relation to the piston displacement volume providing a compression ratio of about 8:1 to 12:1, a fuel injection nozzle mounted in the periphery of said chamber and directed to produce a fuel jet into a localized portion of the swirling air at one side of a diameter of said chamber and substantially across the thickness thereof, positive ignition means mounted adjacent the periphery of said chamber less than 90° of arc downstream of said nozzle, means coordinated with engine operation for initiating fuel injection about 50 to 25° before top dead center of said piston compression stroke, and for immediately actuating said positive ignition means to establish a flame front across a radius of said chamber traveling counter to the direction of air swirl therein, said throat passage restricting and directing the flow of combustion air off center into said chamber and tangential to a concentric circle of said chamber having a diameter varying from about ½ to ¾ of that of said auxiliary chamber for maintaining the regularity of the air swirl in said chamber throughout the injection period in spite of the combustion occurring simultaneously therein, and means for controlling the rate of injection coordinated with the air swirl velocity to impregnate succeeding portions of the swirling air immediately in advance of the formed flame front at a controlled fuel-air ratio so that succeeding portions of combustible mixture are progressively formed and burned substantially as rapidly as formed with combustion occurring on the Otto cycle and injection terminating around top dead center for full load operation.

10. In an internal combustion engine of the reciprocating piston type having a compression air swirl auxiliary combustion chamber connected to the main cylinder space by a relatively short throat passage, with the piston having substantially only mechanical clearance in the main cylinder space at the top of its compression stroke, the combination wherein said auxiliary chamber is disc-shaped with a diameter substantially greater than its thickness and with a volume in relation to the piston displacement volume providing a compression ratio of about 8:1 to 12:1, a fuel injection nozzle mounted in the periphery of said chamber and directed to produce a fuel jet into a localized portion of the swirling air at one side of a diameter of said chamber and substantially across the thickness thereof, positive ignition means mounted adjacent the periphery of said chamber less than 90° of arc downstream of said nozzle, means coordinated with engine operation for initiating fuel injection about 50° to 25° before top dead center of the piston compression stroke, and for immediately actuating said positive ignition means to establish a flame front across a radius of said chamber traveling counter to the direction of air swirl therein, said throat passage restricting and directing the flow of combustion air off center into said chamber and tangential to a concentric circle of said chamber having a diameter varying from about ½ to ¾ of that of said auxiliary chamber for maintaining the regularity of the air swirl in said chamber throughout the injection period in spite of combustion occurring simultaneously therein, and means for controlling the rate of injection coordinated with the air swirl velocity to impregnate succeeding portions of the swirling air immediately in advance of the formed flame front at a controlled fuel-air ratio so that succeeding portions of combustible mixture are progressively formed and burned substantially as rapidly as formed with combustion occurring on the Otto cycle and injection terminating around the top dead center for full load operation, said main cylinder space having air inlet ports formed through the wall defining said space for opening by said piston just before the end of a power stroke, exhaust valves located on opposite sides of said auxiliary combustion chamber, and means for opening said exhaust valves in coordination with the opening of said inlet ports to scavenge combustion products through said main cylinder space and out of said auxiliary combustion chamber during the latter portion of said power stroke and the initial portion of a compression stroke.

References Cited in the file of this patent

UNITED STATES PATENTS

| Number | Name | Date |
| --- | --- | --- |
| 1,805,670 | Miller | May 19, 1931 |
| 1,835,490 | Hesselman | Dec. 8, 1931 |
| 2,036,253 | Bremser | Apr. 7, 1936 |
| 2,051,204 | Elwell | Aug. 18, 1936 |
| 2,061,826 | Bremser | Nov. 24, 1936 |
| 2,317,536 | Hocke | Apr. 27, 1943 |
| 2,411,740 | Malin | Nov. 26, 1946 |
| 2,412,821 | Malin et al. | Dec. 17, 1946 |
| 2,431,857 | Fenney | Dec. 2, 1947 |
| 2,431,875 | MacKenzie | Dec. 2, 1947 |
| 2,448,950 | Barber et al. | Sept. 7, 1948 |
| 2,484,009 | Barber | Oct. 11, 1949 |

FOREIGN PATENTS

| Number | Country | Date |
| --- | --- | --- |
| 185,706 | Great Britain | Sept. 14, 1922 |
| 386,785 | Great Britain | Jan. 26, 1933 |
| 730,932 | France | Aug. 26, 1932 |

OTHER REFERENCES

"Air Swirl in Oil Engines," by J. F. Alcock, B. A., A. M. I. Mech. E, published in "The Automobile Engines," Feb. 1935, pages 49-54.